(12) United States Patent
Takashima et al.

(10) Patent No.: US 7,541,915 B2
(45) Date of Patent: Jun. 2, 2009

(54) ANTI-THEFT SYSTEM FOR VEHICLE

(75) Inventors: Masaki Takashima, Chiryu (JP);
Takashi Ishikawa, Anjo (JP)

(73) Assignee: DENSO CORPORATION, Kariya (JP)

( * ) Notice: Subject to any disclaimer, the term of this patent is extended or adjusted under 35 U.S.C. 154(b) by 285 days.

(21) Appl. No.: 11/586,699

(22) Filed: Oct. 26, 2006

(65) Prior Publication Data
US 2007/0096884 A1    May 3, 2007

(30) Foreign Application Priority Data

Oct. 28, 2005  (JP) .............................. 2005-313889
Feb. 28, 2006  (JP) .............................. 2006-052421

(51) Int. Cl.
*B60R 25/10* (2006.01)
(52) U.S. Cl. ................................ 340/426.1
(58) Field of Classification Search ............ 340/426.1, 340/429, 426.12, 426.18, 463, 573.1, 426.19, 340/506, 539.13, 995.28, 521, 691.6, 825.36, 340/127; 307/10.2
See application file for complete search history.

(56) References Cited

U.S. PATENT DOCUMENTS

| 3,772,646 | A | 11/1973 | Keith et al. | |
| 5,801,618 | A * | 9/1998 | Jenkins | 340/426.14 |
| 6,515,580 | B1 * | 2/2003 | Isoda et al. | 340/425.5 |
| 7,103,454 | B2 | 9/2006 | Stock et al. | |
| 2003/0030548 | A1 * | 2/2003 | Kovacs et al. | 340/426 |
| 2004/0217849 | A1 | 11/2004 | Maehara | |

FOREIGN PATENT DOCUMENTS

| DE | 198 38 233 | 2/2000 |
| DE | 100 59 088 | 7/2002 |
| DE | 101 10 493 | 9/2002 |
| DE | 101 56 425 | 5/2003 |
| EP | 1 188 625 | 3/2002 |
| EP | 1 312 520 | 5/2003 |
| GB | 2 397 930 A | 8/2004 |
| JP | A-4-123956 | 4/1992 |
| JP | A-04-215547 | 8/1992 |
| JP | A-2006-273083 | 10/2006 |

OTHER PUBLICATIONS

Search Report from Great Britain Patent Office issued on Feb. 16, 2007 for the corresponding Great Britain patent application No. GB0621465.4.
Office Action dated Apr. 22, 2008 in corresponding German Patent Application No. 10 2006 050 591.3-51 (and English translation).

* cited by examiner

*Primary Examiner*—Phung Nguyen
(74) *Attorney, Agent, or Firm*—Posz Law Group, PLC

(57) ABSTRACT

In an anti-theft system for a vehicle, a tilt signal generating device outputs a tilt signal based on a tilt of the vehicle. A characteristic sensing device receives the tilt signal and detects a characteristic of the tilt signal. A computing device computes a change of a parameter based on the characteristic of the tilt signal. A state estimating device estimates a parking state of the vehicle based on the change of the parameter. A determination rule setting device sets a determination rule based on an estimation result of the state estimating device. A determining device generates an operational signal when the determining device determines that there is fear of theft by comparing the tilt and the determination rule. A warning device informs the fear of the theft of the vehicle based on the operational signal.

18 Claims, 7 Drawing Sheets

ANTI-THEFT SYSTEM FOR VEHICLE

CROSS REFERENCE TO RELATED APPLICATION

This application is based on and incorporates herein by reference Japanese Patent Application No. 2005-313889 filed on Oct. 28, 2005 and Japanese Patent Application No. 2006-52421 filed on Feb. 28, 2006.

BACKGROUND OF THE INVENTION

1. Field of the Invention

The present invention relates to a vehicle anti-theft system, which limits theft by sensing a tilt of a vehicle using a tilt sensor (e.g., an acceleration sensor) to warn. Also, the present invention relates to an anti-theft system for a four-wheel vehicle and a two-wheel vehicle.

2. Description of Related Art

Conventionally, anti-theft systems, which limit theft of a vehicle due to invasion, a window breakdown, and jack-up, have been available. With regard to the jack-up, Japanese Unexamined Patent Publication No. H4-215547 discloses a vehicle anti-theft system, which includes a tilt sensor for sensing a tilt of the vehicle using a vibration detector for the vehicle. Here, the vibration detector includes a pendulum and an optical element.

The vehicle anti-theft system disclosed in Japanese Unexamined Patent Publication No. H4-215547 detects a characteristic of pulses based on a pulse number per unit time and a pulse width of the pulses outputted by the vehicle vibration detector. Then, the vehicle anti-theft system compares the detected characteristic with a predetermined determination rule to determine whether the outputted pulses indicates behavior of the theft or of another. Thus, erroneous determination can be limited.

However, the vehicle anti-theft system disclosed in Japanese Unexamined Patent Publication No. H4-215547 may not cope with various parking environments, because the above determination rule is predetermined.

For example, when the vehicle is parked under a severe environment, in which the vehicle is frequently vibrated (e.g., a side of a major road, a side of a construction site, a simply-built multistory parking area), the vehicle vibration detector may detect vibration due to the environment. In this case, the pulse outputted from the vehicle vibration detector is also compared with the predetermined determination rule. If the pulse has a characteristic that can be regarded (determined) as the behavior of the theft, it would be determined as the possible theft every time the vehicle is vibrated, although the vibration is not related to the theft. Therefore, a warning of a horn or siren may be repeatedly operated and thereby annoying neighbors.

A determination rule, which would not cause the above erroneous detection, is preferably required. However, from a viewpoint of the vehicle anti-theft, the warning should be operated as often as possible if the situation is suspected to be the vehicle theft (i.e., if the situation indicates the possible theft). Also, the anti-theft of the vehicle would not be realized if the determination rule were merely mitigated.

Some automobiles and auto bicycles include an electronic control unit (ECU) dedicated to a vehicle anti-theft. This ECU has a tilt sensor in order to reduce the theft of wheels or the vehicle itself due to the jack-up. Further, recently, it is suggested that other sensors (e.g., an acceleration sensor that is mounted to a vehicle for other purpose than the anti-theft use) may be used for the anti-theft purpose. This causes a cost reduction because the ECU dedicated to the vehicle anti-theft is not required.

For example, Japanese Unexamined Patent Publication No. 2004-243806 corresponding to US Patent Publication No. 2004-217849 discloses that various acceleration sensors, which are mounted to the vehicle for other purpose than the anti-theft use, are used for the original purpose and also for the anti-theft purpose. Specifically, when a sensitivity of the sensor is changed from a first sensitivity to a second sensitivity during a period, where the anti-theft command for the anti-theft operation is given. Here, the first sensitivity is used for the original purpose, and the second sensitivity is different from the first sensitivity. Then, it is determined whether the vehicle is under a threat of the theft based on whether the acceleration (tilt angle) detected by the acceleration sensor is larger than a predetermined threshold vale or not.

However, because the anti-theft system of the Japanese Unexamined Patent Publication No. 2004-243806 uses a constant threshold valve (fixed at 0.1 G) for determining whether the vehicle is under the theft or not, erroneous detections may occur, and also the detection may delay. When the vehicle is parked at a flat surface, which is flattened due to snow, the erroneous detection may occur. This is because when the snow melts, the flat surface may not be flat and thereby the vehicle tilts. In this case, because the vehicle tilts, the acceleration (tilt angle) detected by the acceleration sensing device exceeds the threshold value. Thus, it is determined that the vehicle is under the theft. Also, when the vehicle is quickly jacked up, it takes time before it is finally determined that the vehicle is under the theft because of a computation process for determining whether the acceleration (tilt angle) detected by the acceleration sensing means exceeds the threshold value.

SUMMARY OF THE INVENTION

The present invention is made in view of the above disadvantages. Thus, it is an objective of the present invention to address at least one of the above disadvantages.

To achieve the objective of the present invention, there is provided an anti-theft system for a vehicle, the anti-theft system including a tilt signal generating device, a control device, and a warning device. The tilt signal generating device outputs a tilt signal based on the tilt of the vehicle relative to a predetermined plane. The control device detects the tilt of the vehicle based on the tilt signal generated by the tilt signal generating device. The control device determines whether there is fear of theft of the vehicle by comparing a tilt angle corresponding to the detected tilt and a determination rule, and the control device generates an operational signal when the control device determines that there is the fear of the theft. The warning device informs the fear of the theft of the vehicle based on the operational signal generated by the control device. The control device includes a determination rule setting device, a characteristic sensing device, a computing device, a state estimating device, and a determining device. The determination rule setting device sets the determination rule used for determining whether there is the fear of the theft of the vehicle. The characteristic sensing device receives the tilt signal generated by the tilt signal generating device and detects a characteristic of the tilt signal. The computing device computes a change of a parameter, which is used for setting the determination rule, based on the characteristic of the tilt signal. The state estimating device estimates a parking state of the vehicle based on the change of the parameter computed by the computing device. The determining device generates the operational signal when the determining device determines that there is the fear of the theft by comparing the tilt angle and the determination rule. The determination rule setting device sets the determination rule based on an estimation result of the state estimating device.

To achieve the objective of the present invention, there is also provided an anti-theft system for a vehicle, the anti-theft system including a sensor, a threshold value determining device, and a determining device. The sensor senses a tile of the vehicle relative to a predetermined plane to output a sensing amount. The threshold value determining device determines a threshold value based on a time change of the sensing amount. The determining device determines whether the vehicle is under theft based on a relation between the sensing amount and the threshold value.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

First Embodiment

Figure 1:
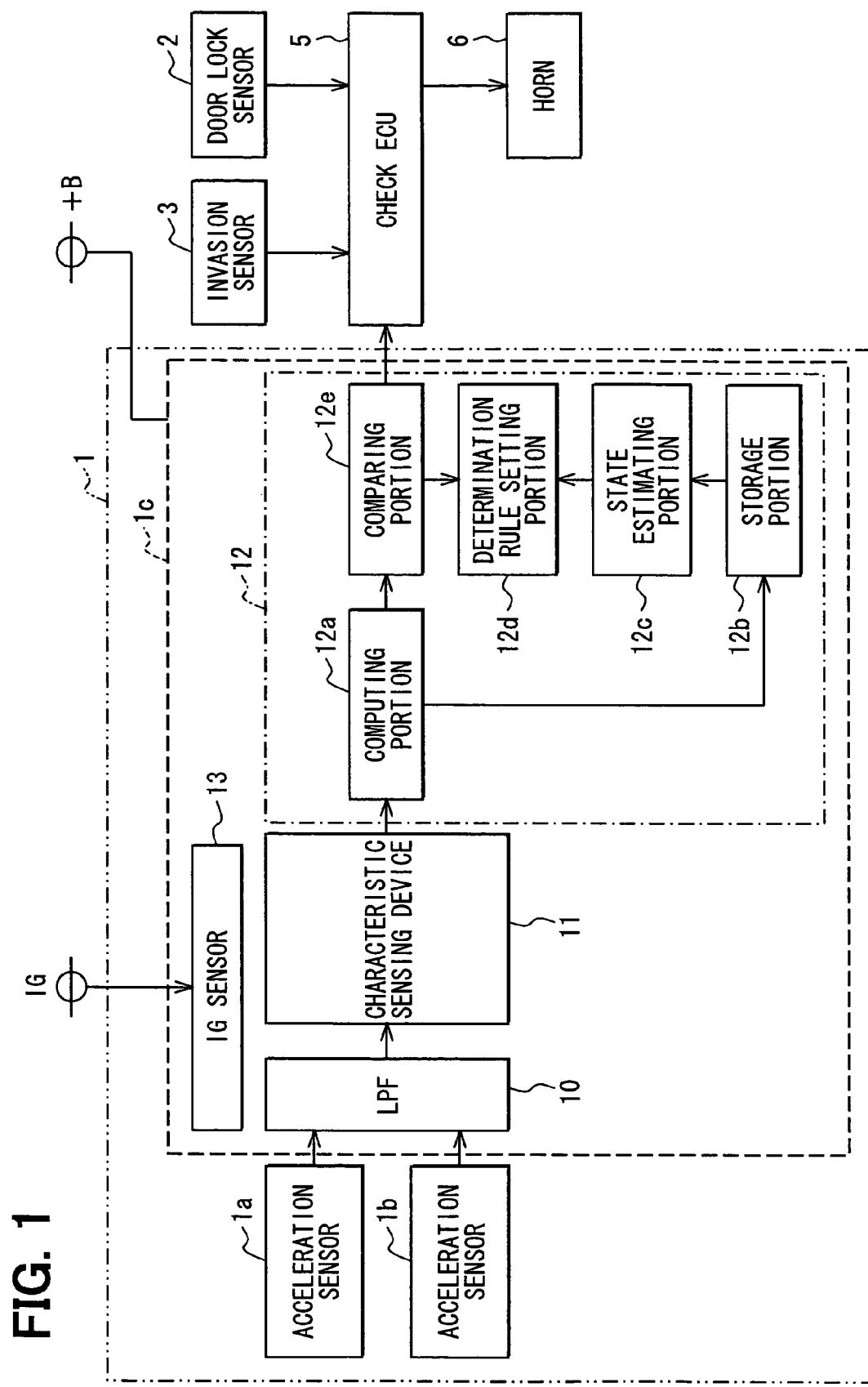
FIG. 1 is a block diagram of a vehicle anti-theft system according to a first embodiment of the present invention.

The first embodiment of the present invention will be described with reference to accompanying drawings. Each step in the drawing, corresponds to a device that executes each process.

As shown in FIG. 1, a vehicle anti-theft system includes a tilt sensor 1, a door lock sensor 2, an invasion sensor 3, a check electronic control unit (check ECU) 5 and a horn 6.

The tilt sensor 1 is designed to include two acceleration sensors 1a, 1b and a microcomputer 1c. The two acceleration sensors 1a, 1b detect accelerations in two horizontal directions of a vehicle, each of which is perpendicular to each other. In other words, the two acceleration sensors 1a, 1b detect the acceleration in a longitudinal direction of the vehicle and the acceleration in a transverse direction of the vehicle. Each of the acceleration sensors 1a, 1b generates a detection output based on the acceleration in the longitudinal direction or in the transverse direction, and then the detection output is inputted into the microcomputer 1c.

The microcomputer 1c receives the detection outputs supplied from the acceleration sensors 1a, 1b, and converts the acceleration indicated as an analog signal into a physical value using an internal A/D converter. Then, the microcomputer 1c computes a change of a tilt angle of the vehicle based on the physical value of the acceleration of the longitudinal or transverse direction of the vehicle, which is outputted from each of the acceleration sensors 1a, 1b. Then, the microcomputer 1c determines whether there is a fear of vehicle theft by the jack-up.

Specifically, the microcomputer 1c includes a low pass filter (LPF) 10, a characteristic sensing device 11, an reasoning device 12, and an IG sensor 13.

The LPF 10 extracts a signal of a predetermined frequency band from the detection outputs supplied from the acceleration sensors 1a, 1b such that a wave form of the detection output can be shaped without high frequency noises.

The characteristic sensing device 11 senses a characteristic of the extracted detection output (acceleration signal) of the acceleration sensors 1a, 1b at the predetermined frequency band. Here, the extracted detection output is extracted by the LPF 10. The acceleration signal will be described.

When the acceleration is applied in a corresponding direction, which corresponds to either of detection directions of the acceleration sensors 1a, 1b, the acceleration signal, which fluctuates (pulses) based on the acceleration, is outputted. A pulse wave form of the acceleration signal indicates the applied (inputted) acceleration. Thus, a condition of the applied acceleration can be investigated through checking a pulse number per unit time, a pulse width per unit time, and a change amount of the pulse per unit time (change rate of the pulse) of the acceleration signal.

Figure 2A:
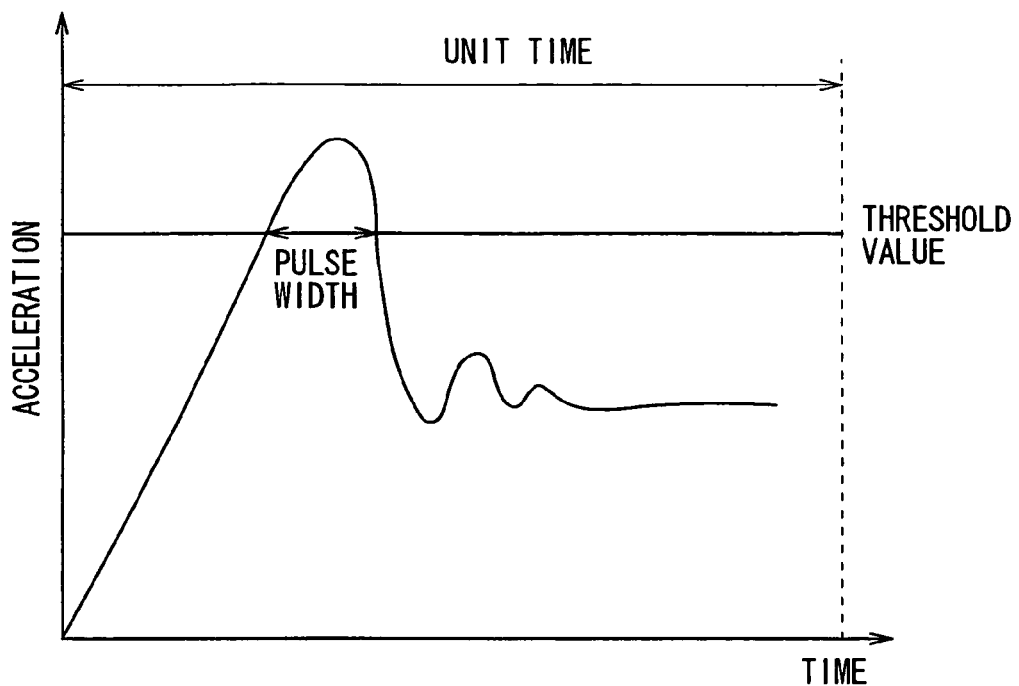
FIG. 2A is a chart showing a wave form of an acceleration signal in a case of a possible vehicle theft by a jack-up.
Figure 2B:
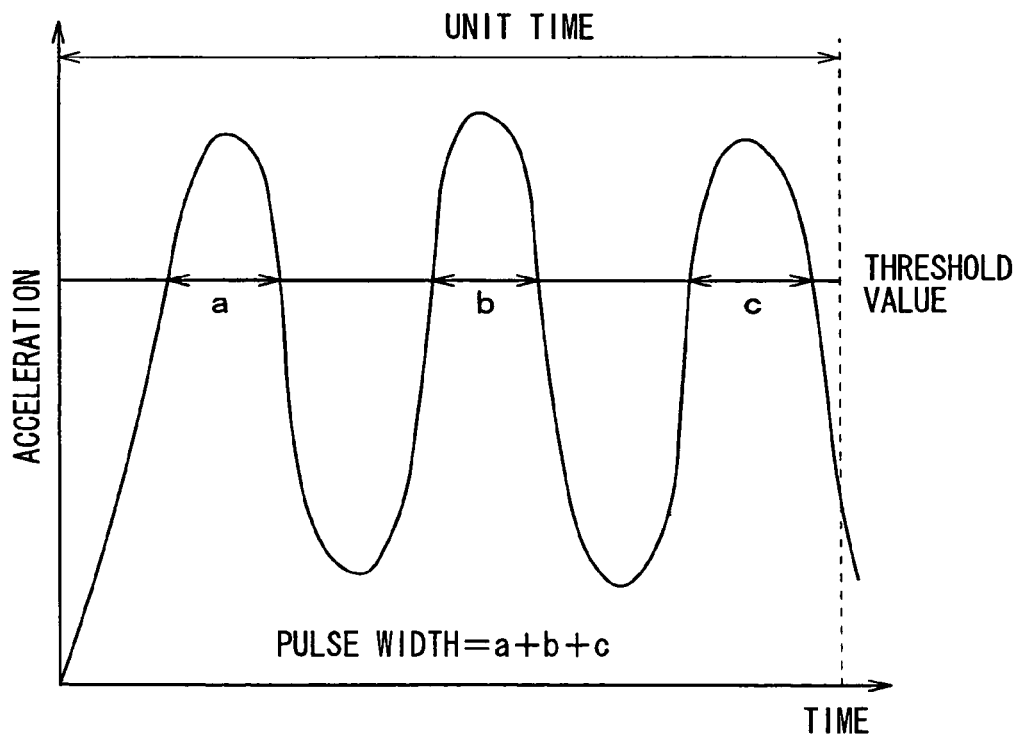
FIG. 2B is a chart showing a wave form of the acceleration signal in a case of a severe environment.

FIGS. 2A, 2B show wave forms of the acceleration signal. FIG. 2A shows the wave form of the acceleration signal in a case of a possible vehicle theft by the jack-up. FIG. 2B shows the wave form of the acceleration signal in a severe environment, at which the vehicle is frequently vibrated (e.g., at a side of a major road, at a side of a construction site, at a simply-built multistory parking area, under a strong wind condition at a severe tropical storm).

As shown in FIG. 2A, in the case of the vehicle theft by the jack-up, the acceleration signal has the wave form, which indicates that the acceleration momentarily increases and then gradually converges. Also, as shown in FIG. 2B, under the severe environment, the acceleration signal has the wave form, which indicates that the acceleration is repeatedly applied in short intervals.

Therefore, the characteristic of the wave form of the acceleration signal explains how the acceleration, which is applied to the acceleration sensor 1a, 1b, is generated. For example, the pulse number per unit time is larger under the severe environment than the case of the vehicle theft by the jack-up. Also, the pulse width is larger under the severe environment than the case of the vehicle theft by the jack-up. As shown in FIG. 2B, the pulse width per unit time under the severe case is a total of pulse width a, b, and c, each of which is a pulse width over a predetermined threshold value, within a unit time. The change rate of the pulse is smaller in the case of the jack-up than the case under the severe environment, because a rise of the pulse tends to be moderate in the jack-up case.

Therefore, the characteristic sensing device 11 extracts the characteristic of the acceleration signal such that the reasoning device 12 can obtain the pulse number per unit time, the pulse width per unit time, or the change rate of the pulse. A peak value of the acceleration indicated by the acceleration signal is also extracted as the characteristic of the acceleration signal, and the extracted characteristic is transmitted to the reasoning device 12.

The reasoning device 12 determines whether there is the fear of the vehicle theft based on the characteristic of the acceleration signal extracted by the characteristic sensing device 11. In other words, when the acceleration is applied to the acceleration sensors 1a, 1b, the reasoning device 12 computes a tilt angle of the vehicle based on the acceleration. Then, the reasoning device 12 determines whether the tilt of the vehicle is caused by the jack-up or other factors. Then, when the reasoning device 12 determines that there is the fear of the vehicle theft, a signal, which indicates the fear of the vehicle theft, is outputted to the check ECU 5.

Specifically, the reasoning device 12 includes a computing portion 12a, a storage portion 12b, a state estimating portion 12c, a determination rule setting portion 12d and a comparing portion 12e.

The computing portion 12a computes the pulse number per unit time, the pulse width per unit time, or the change of the pulse (change rate of the pulse) as the characteristic of the acceleration signal, which is detected by the characteristic sensing device 11. Also, the computing portion 12a computes the tilt angle of the vehicle based on the acceleration as the characteristic of the acceleration signal. It is noted that as described above, the pulse number per unit time, the pulse width per unit time, or the change of the pulse directly indicates the characteristic of the acceleration signal. Also, the characteristic of the acceleration signal can be represented by the vehicle tilt angle because the acceleration signal is also used for computing the vehicle tilt angle.

The storage portion 12b stores computation results of the computing portion 12a. For example, the storage portion 12b stores the computation results for a predetermined interval, and the stored results are renewed every predetermined interval.

The state estimating portion 12c estimates the vehicle parking environment condition based on the temporarily stored results in the storage portion 12b. The state estimating portion 12c prestores various patterns that can be used for estimating the environment condition. Thus, the state estimating portion 12c estimates the vehicle parking environment condition with reference to the patterns.

For example, the state estimating portion 12c stores patterns of the pulse number, the pulse width and the change of the pulse, which associate with the severe environment. When the computed the pulse number, the pulse width and the change of the pulse correspond to the above severe environment patterns, the state estimating portion 12c estimates that the vehicle parking area is under the severe environment.

Also, the state estimating portion 12c also stores a non-severe determination rule for a non-severe environment for estimating the environment condition. The state estimating portion 12c estimates the vehicle parking environment condition based non the non-severe determination rule. Here, the non-severe determination rule is set by the determination rule setting portion 12d, as described later, when the vehicle parking location is not under the severe environment. In the present embodiment, a determination rule defines a threshold value for determining the possible theft of the vehicle. For example, in the non-severe determination rule, a warning is given when the tilt angle of the vehicle becomes a predetermined threshold value (e.g., 1.6 degree). However, this predetermined degree (threshold value) can also be used for estimating the parking environment of the vehicle. Typically, when the vehicle is frequently tilted by a degree corresponding to 80% of the above predetermined degree of the non-severe determination rule, the state estimating portion 12c estimates that the vehicle parking area is under the severe environment.

The determination rule setting portion 12d sets the determination rule, which is used for determining that the vehicle is under the fear of the theft. For example, the determination rule setting portion 12d sets a threshold value for the tilt angle for determining the vehicle is under the fear of the theft. The determination rule setting portion 12d changes the threshold value for the tilt angle based on the estimation result by the state estimating portion 12c.

Typically, under the non-severe environment, in which the determination rule is set to give a warning, for example, when the tilt angle of the vehicle becomes 1.6 degree (i.e., when the tilt angle becomes the threshold value of 1.6 degree). In this case, when the state estimating portion 12c estimates that the vehicle parking area is under the severe environment, the determination rule is changed to be moderate. For example, the threshold value may be changed to 2.5 degree. In other words, the determination rule is changed relative to a reference value such that it becomes less likely to be determined that there is the fear of the vehicle theft. Here, the reference value is defined as a determination rule for a normal condition.

That is, when the vehicle parking location is under the severe environment, the tilt angle of the vehicle frequently fluctuates although the vehicle is not jacked up for vehicle theft. Thus, if the threshold value for the tilt angle were set at a low value, the tile angle of the vehicle might frequently exceed the threshold value. Therefore, in the above condition, the threshold value is changed such that the determination rule becomes moderate. As a result, the erroneous warning is not likely to occur when the vehicle is not under the fear of the theft.

Although advantages of the severe environment condition has been exclusively described so far, advantages can be attained by changing the determination rule of the non-severe environment condition. That is, when the state estimating portion 12c determines that the vehicle parking area is under a very quiet environment (non-severe environment) as a result of data analysis of stored data of the predetermined interval, the determination rule can be made strict, in contrast. In a case of the determination rule, where the threshold value for the tilt angle is set at 1.6 degree (i.e., the warning is given when the tilt angle of the vehicle becomes 1.6 degree), the determination rule is changed when the state estimating portion 12c estimates that the vehicle parking location is under the quiet environment. In this case, the threshold value is set at, for example, 1.2 degree so that the determination rule is made strict. This enhances the warning performance for vehicle theft.

The comparing portion 12e compares the tilt angle of the vehicle computed by the computing portion 12a and the threshold value set by the determination rule setting portion 12d. By doing this, the comparing portion 12e determines whether the computed tilt angle of the vehicle exceeds the threshold value to determine whether there is the fear of the vehicle theft.

The IG sensor 13 senses an ON/OFF state of an IG switch. When the IG switch is turned on, a predetermined voltage is applied to the IG sensor 13. The IG sensor 13 senses the ON/OFF state of the IG switch based on an electric potential of a terminal, to which the voltage is applied. Here, Hi and Low signal shows whether the predetermined voltage is applied or not. In a condition, where the IG sensor 13 senses that the IG switch is at an OFF state, the microcomputer 1c is intermittently switched from a sleep state to a wake-up state such that the LPF, the characteristic sensing device 11, and the reasoning device 12 are operated.

The door lock sensor 2 detects a door-lock state (lock/unlock) and outputs a door-lock signal indicative of the door-lock state. For example, the door lock sensor 2 senses that the door is locked when the door is locked using a remote key of a keyless entry system. The door lock sensor 2 transmits a signal indicative of the door lock state to the check ECU 5. In another example, the door lock sensor 2 senses the door lock state based on a door lock detection signal or an on/off signal in a case where a body ECU (not shown) deals with the above door lock detection signal or the on/off signal transmitted to a door lock (solenoid) actuator.

The invasion sensor 3 includes, for example, an infrared rays sensor, and senses a human invasion of the vehicle. Here, in the present embodiment, the vehicle anti-theft system includes the invasion sensor 3, which serves as a theft detector for detecting a theft method other than the jack-up. However, the vehicle anti-theft system may includes a glass break sensor.

The check ECU 5 determines that there is the fear of vehicle theft (possible vehicle theft) based on the signals supplied from the title sensor 1, the door lock sensor 2, and the invasion sensor 3 and operates the horn 6.

Specifically, the check ECU 5 receives the door lock signal from the door lock sensor 2. When the door lock signal indicates that the door is locked, the check ECU 5 outputs a security-ON signal to the tilt sensor 1. This sets the tilt sensor 1 for a guard against the vehicle theft. Also, when the door lock signal indicates that the door is unlocked after the security-ON signal has been outputted, the check ECU 5 outputs a security-OFF signal to the tilt sensor 1. This cancels the guard by the tilt sensor 1 against the vehicle theft.

Therefore, when the microcomputer 1c receives the security-ON signal, the microcomputer 1c becomes ready to determine whether there is the possible vehicle theft based on the detection outputs from the acceleration sensors 1a, 1b. Thus, the microcomputer 1c guards the vehicle against the theft. When the microcomputer 1c receives the security-OFF signal, the microcomputer 1c cancels the guard against the vehicle theft.

When the ECU 5 receives the signal from the tilt sensor 1, which indicates the possible vehicle theft, or the signal from the invasion sensor 3, which indicates the human invasion of the vehicle, the ECU 5 outputs an operational signal for operating the horn 6.

The horn 6 is operated based on the operational signal outputted from the check ECU 5. The horn 6 gives warning against the possible vehicle theft using a sound (e.g., horn, siren). Here, the horn 6 is described as an example of an warning device. However, the warning device may include a communication device for contact a mobile phone of a user such that the warning device can warn the user away from the vehicle in case of the vehicle theft.

Next, a vehicle anti-theft warning process will be described. The warning process is executed by the microcomputer 1c of the above described vehicle anti-theft system.

Figure 3:
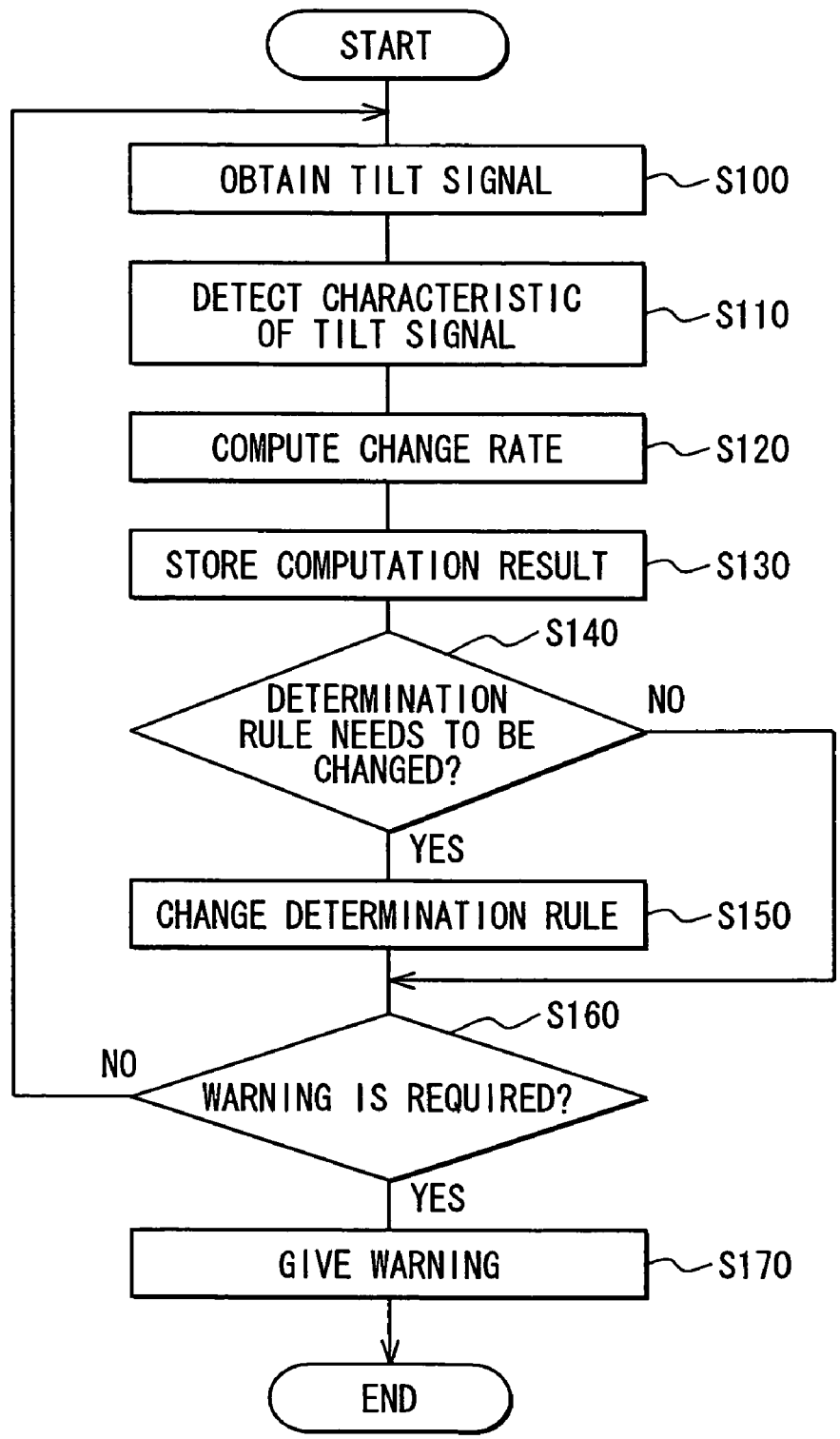
FIG. 3 is a flow chart of a vehicle anti-theft warning process according to the first embodiment.

FIG. 3 shows a flow chart of the vehicle anti-theft warning process. In the present embodiment, the warning process shown in FIG. 3 is executed every predetermined sampling interval when the microcomputer 1c receives the security-ON signal from the check ECU 5 in a state where the IG switch is detected at the OFF state.

Firstly, at step S100, a tilt signal (i.e., the detection output from the acceleration sensor 1a, 1b) is captured. The LPF 10 of the microcomputer 1c performs this step.

Then, at step S110, a tilt signal characteristic detection is performed. In other words, the microcomputer 1c detects the characteristic of the acceleration signal of the predetermined frequency band, which passes the LPF 10. The characteristic sensing device 11 of the microcomputer 1c performs the above step.

Then, at step S120, the various computation is performed based on the characteristic of the acceleration signal obtained at step S110. The various computation includes computing the pulse number per unit time, the pulse width per unit time, the change of the pulse (change rate of the pulse). Also, the computation includes computing the tilt angle of the vehicle based on the acceleration. The computing portion 12a of the reasoning device 12 of the microcomputer 1c performs the process at step S120. Then, at step S130, data associated with setting the determination rule is selected from the computation result computed at step S120, and is stored in the storage portion 12b.

Then, at step S140, it is determined whether the determination rule needs to be changed or not. The necessity for changing the determination rule depends on whether the vehicle parking location is under the severe environment or not.

As described above, the characteristic of the acceleration signal at the vehicle theft by the jack-up differs from that caused by the vibration under the severe environment. The state estimating portion 12c prestores the various patterns of the characteristic for estimation of the environment. Thus, the state estimating portion 12c estimates the vehicle parking environment based on the data stored in the storage portion 12b with reference to the prestored patterns.

For example, the pulse number per unit time is larger under the severe environment than the case of the vehicle theft by the jack-up. Thus, a corresponding threshold value is prestored for determining whether the parking location is under the severe environment based on the above pulse number behavior. That is, when the pulse number per unit time is equal to or larger than a stored corresponding threshold value, it is estimated that the parking location is under the severe environment.

Also, the pulse width per unit time (e.g. a pulse width over a predetermined threshold value) is larger under the severe environment than the case of the vehicle theft by the jack-up. Thus, similar to the above case, another corresponding threshold value, which is used for determining whether the parking location is under the severe environment, is also prestored. When the pulse width is equal to or larger than the stored corresponding threshold value, it is estimated that the parking location is under the severe environment.

The change rate of the pulse is larger under the severe environment than the case of the vehicle theft by the jack-up. This is because a rise of the pulse tends to be moderate in the jack-up case. Thus, another corresponding threshold value used for determining whether the parking location is under the severe environment is prestored. When the change rate of the pulse is equal to or larger than the stored corresponding threshold value, it is estimated that the parking location is under the severe environment.

Typically, the determination rule for the non-severe environment condition is applied when the vehicle parking location is not under the severe environment. Under the determination rule, a warning (alarming) is given, for example, when the tilt angle of the vehicle becomes 1.6 degree (predetermined degree). However, when the vehicle is tilted by 80% of the predetermined degree frequently (more often than a predetermined frequency), the state estimating portion 12c estimates that the vehicle parking area is under the severe environment.

In this way, it is determined whether the parking location is under the severe environment or not. When it is determined the determination rule does not need to be changed, the control proceeds to step S160 and the currently selected determination rule is used. In contrast, when it is determined the determination rule needs to be changed, the control proceeds to step S150 and the determination rule is changed.

For example, if the threshold value is set at 1.6 degree (i.e., if the determination rule is set such that a warning is given when the tilt angle of the vehicle becomes 1.6 degree) under the non-severe environment, the threshold value may be changed to 2.5 degree. In this way, the determination rule is changed to be moderate.

Then, at step S160, it is determined whether the warning is required or not. In other words, in step S160, the tilt angle of the vehicle computed at step S120 is compared with the threshold value set as the determination rule. When the computed tilt angle of the vehicle is equal to or larger than the threshold value, it is determined that the warning is required. When the computed tilt angle is less than the threshold value, it is determined that the warning is not required.

When it is determined that the warning is not required, there is assumed no possible vehicle theft. Thus, control loops the above steps until it is determined that the warning is required. When, it is determined the warning is required, control continues with step S170.

As step S170, the warning process is operated. In this process, the microcomputer 1c generates a warning output, which is a signal indicative of the possible vehicle theft. When the check ECU 5 receives the warning output, the check ECU 5 outputs the operational signal for operating the horn 6. Thus, the horn 6 limits the vehicle from being stolen (i.e., the horn 6 enables the vehicle anti theft) by producing an alarm sound.

As above, the vehicle anti-theft system of the present embodiment includes a learning function. In this function, the storage portion 12b starts storing data when the vehicle is parked. Then, the condition of the vehicle parking location is estimated based on the stored data (past data), and the determination rule is changed based on the estimation result.

Therefore, in a situation where the vehicle is parked under the severe environment, the erroneous detection can be limited even if the vibration is applied due to the environment. As a result, the erroneous warnings can be limited compared with the conventional art, in which the determination rule is fixed. Thus, annoyance (e.g., repeated warnings by horns or siren) to the neighbors can be limited.

Modification of the first embodiment will be described. In the first embodiment, the acceleration sensors 1a, 1b serve as an example of a tilt signal generating device that generates the tilt signal. However, the acceleration sensors 1a, 1b can be replaced with a pendulum, which senses the vibration of the vehicle.

Also, in the first embodiment, the parameters used for changing the determination rule are indicated as the pulse number per unit time, the pulse width, the change of the pulse based on the acceleration signal from the acceleration sensor 1a, 1b. Also the parameter is indicated as the tilt angle computed by the acceleration. However, the parameter can be any parameter as long as the any parameter changes with the environment of the vehicle parking location.

Second Embodiment

The second embodiment will be described with reference to FIGS. 4 and 5.

Figure 4:
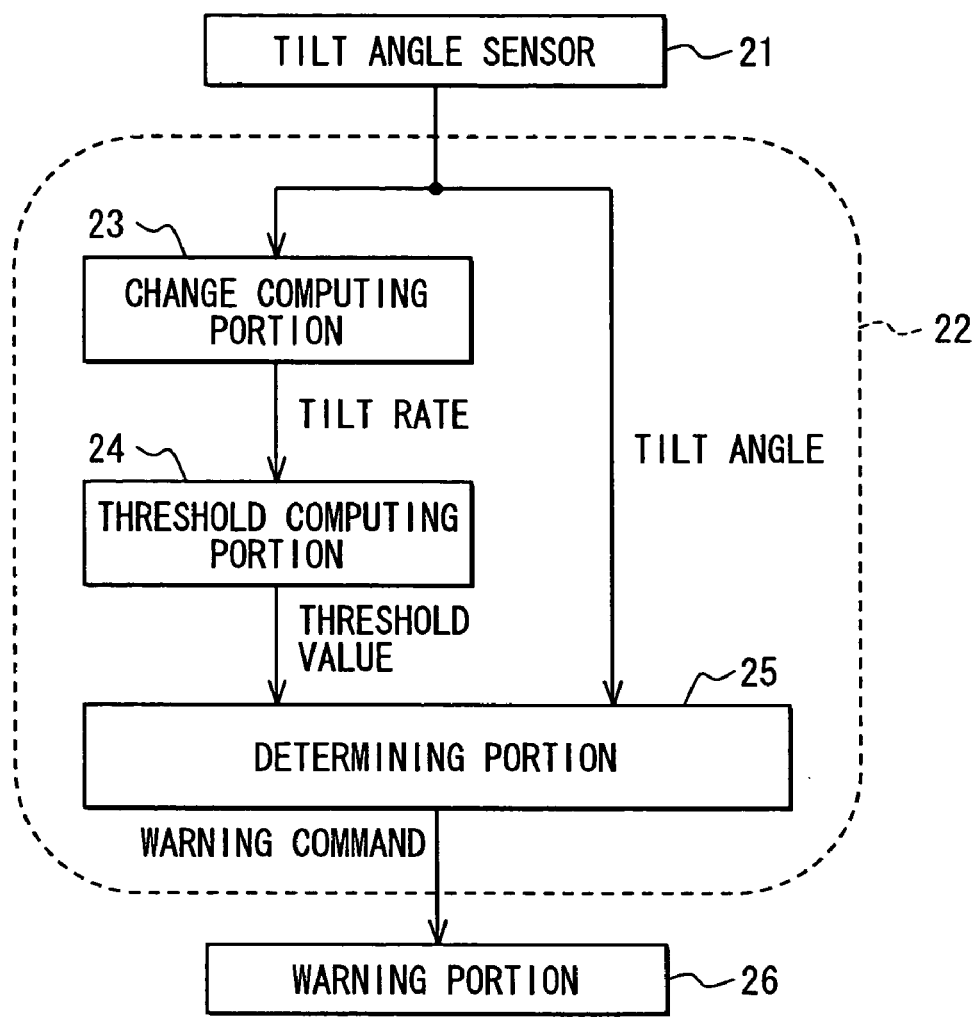
FIG. 4 is a block diagram showing input/output data of an anti-theft system according to a second embodiment of the present invention.

FIG. 4 shows a block diagram of a vehicle anti-theft system of the present embodiment. As shown in FIG. 4, the anti-theft system includes a tilt angle sensor 21, a change computing portion 23, a threshold value computing portion 24, a determining portion 25 and a warning portion 26.

The tilt angle sensor 21 is a sensor module, which includes a sensing function and a converting function. An acceleration sensor mounted on a spring of the vehicle enables the sensing function for measuring a gravitational acceleration applied to the vehicle. The gravitational acceleration is converted into a pitching amount (tilt angle) relative to a horizontal surface in the converting function. Then, the pitching amount (tilt angle) is outputted to the change computing portion 23 and the determining portion 25.

A microcomputer 22 stores the change computing portion 23, the threshold value computing portion 24, and the determining portion 25 in a memory. The change computing portion 23 computes a tilt rate based on the tilt angle outputted from the tilt angle sensor 21. Specifically, firstly, a previous tilt angle of $\Delta t$ second earlier is subtracted from a current tilt angle. Then, the subtraction result is divided by $\Delta t$ to compute a tilt rate (tilt angle change per unit time).

Figure 5:
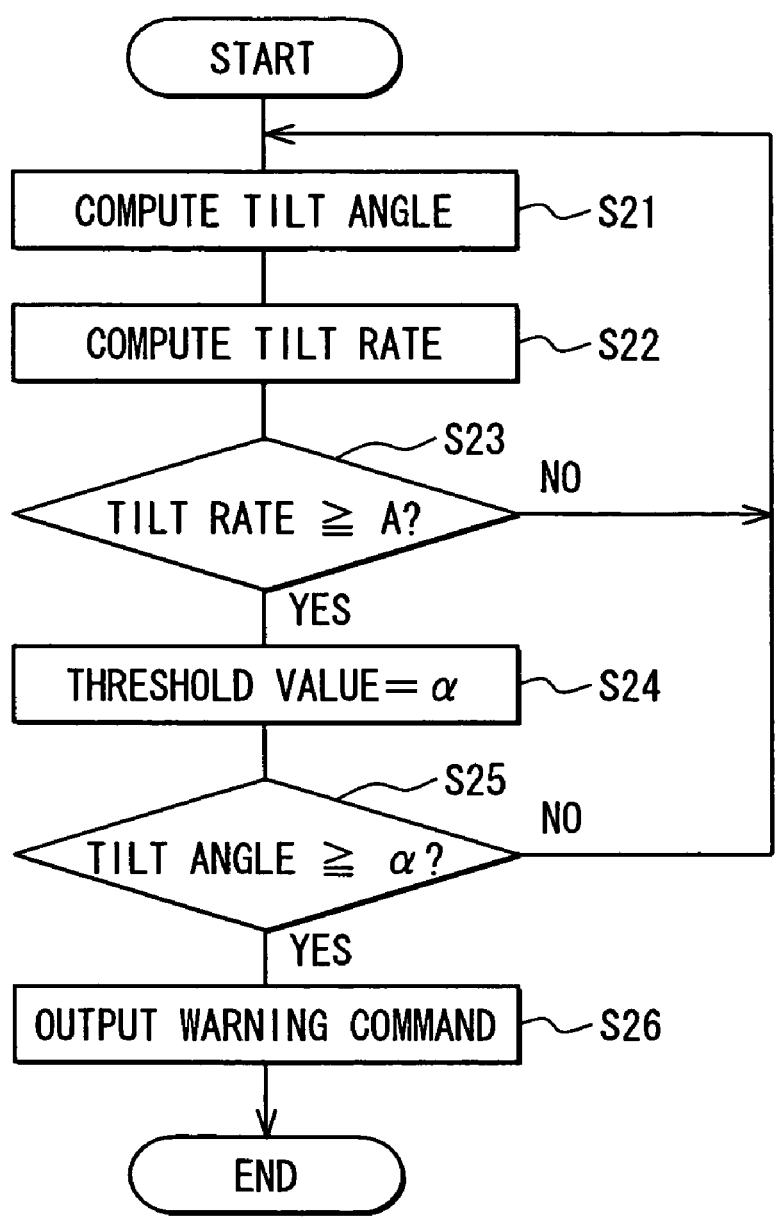
FIG. 5 is a flow chart of a vehicle anti-theft warning process according to the second embodiment.

The threshold value computing portion 24 uses the above computed tilt rate in a computing process shown in FIG. 5 to compute the threshold value. Then, the threshold value computing portion 24 outputs the threshold value.

The determining portion 25 compares the tilt angle outputted from the tilt angle sensor 21 and the threshold value outputted from the threshold value computing portion 24. When the tilt angle is equal to or larger than the threshold value, the determining portion 25 outputs a warning command to the warning portion 26.

When the warning portion 26 receives the warning command, the warning portion 26 generates an alarming sound through a speaker (not shown).

The computing process executed by the change computing portion 23, the threshold value computing portion 24, and the determining portion 25 will be described with reference to a flow chart in FIG. 5. Here, a process from step S21 to step S25 is executed every $\Delta t$ second.

At step S21, the tilt angle is obtained through the tilt angle sensor 21. At step S22, the tilt rate computing portion (change computing portion 23) computes the tilt rate.

Then, at step S23, it is determined whether the tilt rate is equal to or larger than a predetermined rate A or not. When it is determined that the tilt rate is equal to or larger than the predetermined rate A, control continues with step S24. When it is determined that the tilt rate is smaller than the predetermined rate A, control returns to step S21. At step S24, threshold value is set at a predetermined threshold value $\alpha$. Here, the threshold value computing portion 24 executes step S23 and step S24.

The determining portion 25 executes step S25 and step S26. At step S25, it is determined whether the tilt angle is equal to or larger than the predetermined threshold value $\alpha$ or not. When it is determined that the tilt angle is equal to or larger than the predetermined threshold value $\alpha$, control continues with step S26. When it is determined that the tilt angle is smaller than the predetermined threshold value $\alpha$, control returns to step S21. At step S26, the warning command is outputted to the warning portion 26 and the process is ended.

In the anti-theft system of the present embodiment, the threshold value of the tilt angle used for determining the possible vehicle theft depends on the change of the tilt angle (tilt rate). Thus, when the tilt rate is small, in other words, when the tilt angle gradually changes throughout a long period, the threshold value is not set. As a result, the warning command is not generated, and thus, erroneous detection is not likely to occur even in a case where the vehicle is tilted by other reason than the theft, such as snow melt. However, when the tilt angle is quickly changed by the quick jack-up, in other words, when the tilt rate is large, the threshold value $\alpha$ is set. Thus, the determination is made quickly and the warning command can be outputted quickly.

The acceleration sensor of the present embodiment can be used as a pitching sensor of drive control for enhancing a safety drive when the vehicle runs. Thus, dedicated sensing devices exclusively for the anti-theft system may not be required. Also, the determining device for the tilt angle and the tilt rate can be an analog circuit instead of a digital computing device, such as a microcomputer.

Third Embodiment

The third embodiment will be described with reference to FIG. 6. In the third embodiment, two threshold values are set, instead of one threshold value used in the second embodiment. Similar components of the present embodiment, which are similar to the components of the second embodiment, will be indicated by the same numerals, and explanation thereof will be omitted.

Figure 6:
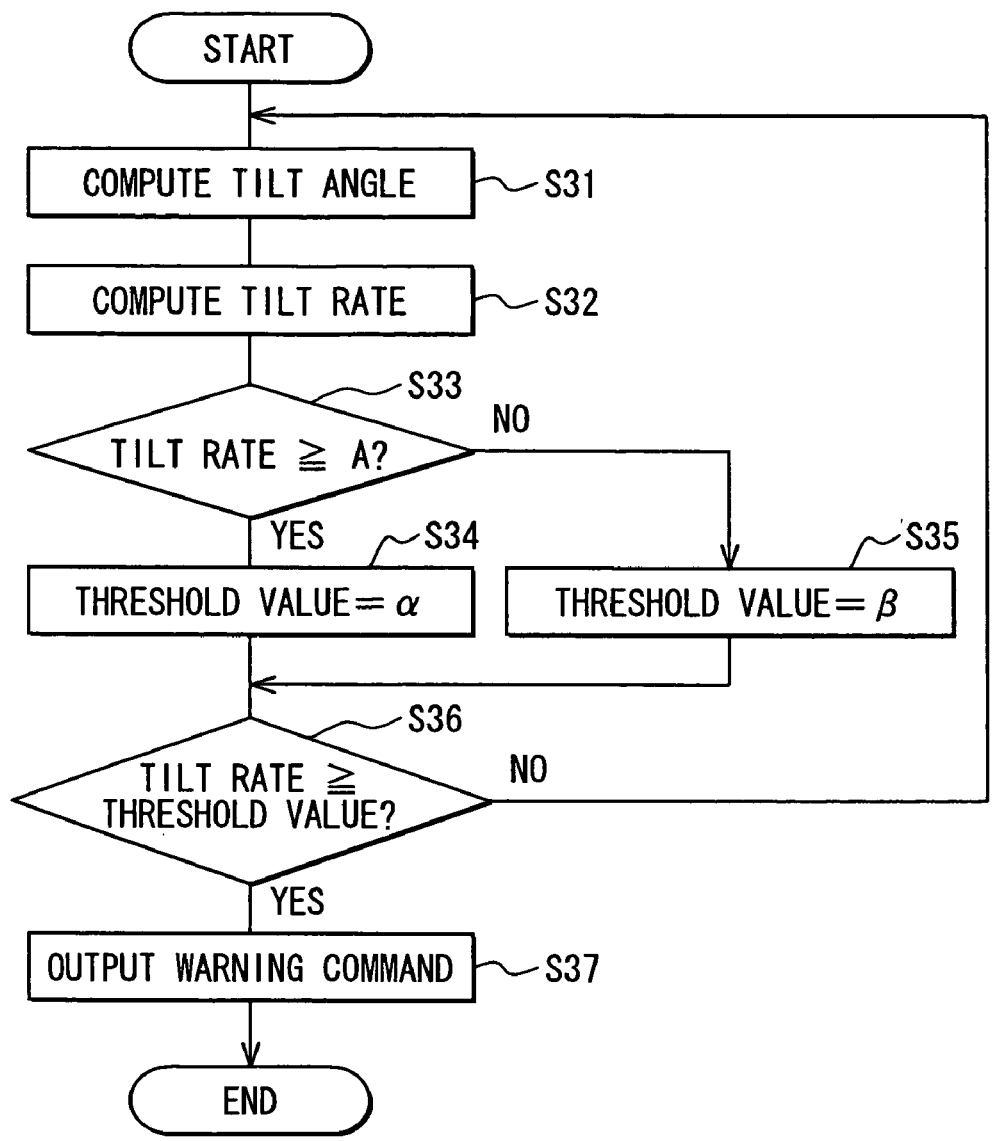
FIG. 6 is a flow chart of a vehicle anti-theft warning process according to a third embodiment of the present invention.

FIG. 6 is a flow chart showing a process of the anti-theft system of the third embodiment. A process from step S31 to step S36 is executed every Δt second.

As step S31, the tilt angle is obtained through the tilt angle sensor 21. At step S32, the tilt rate computing portion (change computing portion 23) computes the tilt rate.

Then, at step S33, it is determined whether the tilt rate is equal to or larger than the predetermined rate A or not. When it is determined that the tilt rate is equal to or larger than the predetermined rate A, control continues with step S34. When it is determined that the tilt rate is smaller than the predetermined rate A, control continues with step S35. At step S34, the threshold value is set at the predetermined threshold value α. At step S35, the threshold value is set at another predetermined threshold value β. Here, the threshold value a is larger than the threshold value β. The threshold value computing portion 24 executes the process in step S33, S34, and S35.

The determining portion 25 executes the process in step S36 and S37. At step S36, it is determined whether the tilt angle is equal to or larger than the threshold value, which is determined either in step S34 or S35. When it is determined that the tilt angle is equal to or larger than the threshold value, control continues with step S37. When it is determined that the tilt angle is smaller than the threshold value, control returns to step S31. At step S37, the warning command is outputted to the warning portion 26, and the process is ended.

In the anti-theft system of the second embodiment, when the tilt rate is smaller than the predetermined rate A, the warning command is not outputted. However, in the third embodiment, step S35 is provided such that warning command can be outputted as long as the tilt angle is equal to or larger than the threshold value β even when the tilt rate is smaller than the predetermined rate A. As a result, the present anti-theft system can outputs the warning command even when the vehicle is jacked up at a low tilt rate (slowly).

Fourth Embodiment

The fourth embodiment will be described with reference to FIG. 7. The fourth embodiment 4 is different from the second embodiment in a point where the threshold value can be set based on the two tilt rates. Similar components of the present embodiment, which are similar to the components of each of the above embodiments, will be indicated by the same numerals, and explanation thereof will be omitted.

Figure 7:
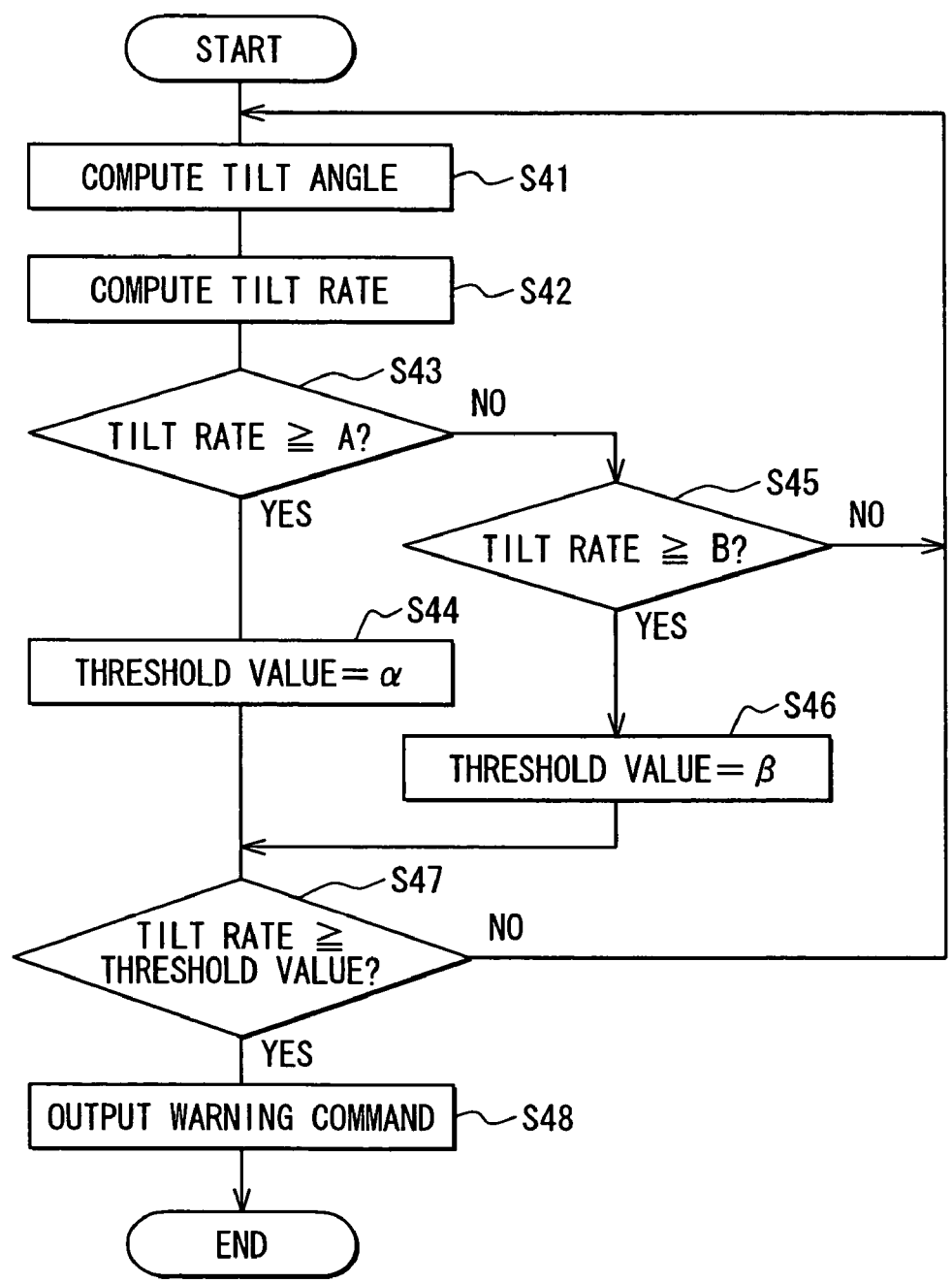
FIG. 7 is a flow chart of a vehicle anti-theft warning process according to a fourth embodiment of the present invention.

FIG. 7 is a flow chart showing a process of the anti-theft system of the fourth embodiment. A process from step S41 to step S47 is executed every Δt second.

As step S41, the tilt angle is obtained through the tilt angle sensor 21. At step S42, the tilt rate computing portion (change computing portion 23) computes the tilt rate.

The, at step S43, it is determined whether the tilt rate is equal to or larger than the predetermined rate A or not. When it is determined that the tilt rate is equal to or larger than the predetermined rate A, control continues with step S44. When it is determined that the tilt rate is smaller than the predetermined rate A, control continues with step S45. At step S44, the threshold value is set at the predetermined threshold value α. At step S45, it is determined whether the tilt rate is equal to or larger than another predetermined rate B or not. When it is determined that the tilt rate is equal to or larger than the predetermined rate B, control continues with step S46. When it is determined that the tilt rate is smaller than the predetermined rate B, control returns to step S41. At step S46, the threshold value is set at the predetermined threshold value β. Here, the predetermined tilt rate A is larger than the predetermined tilt rate B. Also, the predetermined threshold value α is larger than the predetermined threshold value β. The threshold value computing portion 24 executes the processes at step S43 to step S46.

At step S47, it is determined whether the tilt angle is equal to or larger than the threshold value, which is set at step S44 or S45. When it is determined that the tilt angle is equal to or larger than the threshold value, control continues with step S48. When it is determined that the tilt angle is smaller than the threshold value, control returns to step S41. At step S48, the warning command is outputted to the warning portion 26 and the process is ended.

As described above, the anti-theft system of the present embodiment determines the threshold value based on the tilt rate. Thus, the threshold value can be determined based on the tilt rate caused by the jack-up in the theft. As a result, in the present embodiment, it is more accurately determined whether the vehicle is under the theft than in the second embodiment.

Advantages (effects) of the present embodiment will be specifically described.

The Jack-up device may be a floor jack, and may be a winch mounted on a towing car (loader).

In general, a portable manual floor jack provides a slow jack-up (small tilt rate). Also, the winch provides a more quick jack-up (large tilt rate) than the manual floor jack-up.

In general, the vehicle itself cannot be stolen using the floor jack. However, the wheels of the vehicle may be more likely to be stolen while the vehicle is jacked up using the floor jack even though the anti-theft system is activated. In this case, the vehicle may be jacked up slowly using the floor jack-up to a tilt angle, at which the wheels can be removed.

Also in general, the vehicle itself may be lifted by the winch and stolen using the towing car even though the anti-theft system is activated. In this case, the vehicle is lifted by the winch up to a height so that the drive wheels of the vehicle under theft can be placed on a tractor of the towing car. Here, the tractor is a fixing device of the drive wheels and is provided at a rear of the towing car. As above, the vehicle may be lifted more quickly (at a larger lift rate) by the winch up to a larger tilt angle than the case of wheel theft.

Returning to the present embodiment, when the computed tilt rate is equal to or larger than the predetermined rate A (i.e., when the computed tilt rate is high), the threshold value is set at the predetermined threshold value α in step S44 to be larger. Thus, the theft of the vehicle itself using the winch can be detected. Also, when the computed tilt rate is equal to or larger than the predetermined rate B, but is not larger than the predetermined rate A (i.e., when the computed tilt rate is low), the threshold value is set at the predetermined threshold value β to be smaller. Thus, the theft of the wheels using the floor jack can be detected.

In the second to fourth embodiments, the threshold values for determination are fixed values. However, the threshold value can be variable. For example, the theft of the wheels using the floor jack requires jack-up procedures at least twice for fore-and-aft wheels or right-and-left wheels. Also the theft requires time for loosing wheel nuts for each wheel. However, the vehicle theft using the winch is completed quickly because the vehicle is stolen away immediately after the lift is done. Thus, it is preferable to shorten the time for determination. For this reason, the threshold value for determination is changed based on the jack-up device (tilt rate).

For example, the threshold value β at step S46 may corresponds to a tilt angle, which can be calculated by multiplying the current tilt rate (computed tilt rate) by 5 seconds. This means that when the current tilt rate continues for 5 seconds, the tilt angle becomes the threshold value β.

As described above, it is preferable that the determination time for the theft using the winch is shorter than the determination time for the theft using the floor jack. Thus, the threshold value a at step S44 may correspond to a tilt angle computed by multiplying the current tilt rate by 3 seconds. As s result, the determination time can be shortened.

Modification of the embodiment will be described. In the second to fourth embodiments, the tilt angle sensor 21 is described as the acceleration sensor. However, the tilt angle sensor 21 is not limited to the acceleration sensor. For example, a air pressure sensor of the wheels, a level sensor, or an ultrasonic sensor may alternatively serve as the tilt angle sensor 21, because the tilt angle sensor 21 works if it can detect the tilt angle of the vehicle.

In each of the second to fourth embodiments, the tilt rate is computed based on the tilt angle detected by the tilt angle sensor 21. However, the tilt angle sensor 21 does not have to detect the tilt angle. For example, a sensor that senses a tilt rate may be used, and the tilt angle can be computed by integrating the sensed tilt rate.

In each of the second to fourth embodiments, the tilt angle and the tilt rate of the vehicle are used as input data to determine whether the vehicle is under the theft or not. However, the input data for determination are not limited to information associated with the angle. For example, the input data may be a gravitational acceleration perpendicular to a floor of the vehicle.

Additional advantages and modifications will readily occur to those skilled in the art. The invention in its broader terms is therefore not limited to the specific details, representative apparatus, and illustrative examples shown and described.

What is claimed is:

1. An anti-theft system for a vehicle comprising:
    a tilt signal generating device that outputs a tilt signal based on the tilt of the vehicle relative to a predetermined plane;
    a control device that detects the tilt of the vehicle based on the tilt signal generated by the tilt signal generating device, the control device determining whether there is fear of theft of the vehicle by comparing a tilt angle corresponding to the detected tilt and a determination rule, and the control device generating an operational signal when the control device determines that there is the fear of the theft; and
    a warning device that informs the fear of the theft of the vehicle based on the operational signal generated by the control device, wherein:
    the control device includes:
        a determination rule setting device that sets the determination rule used for determining whether there is the fear of the theft of the vehicle;
        a characteristic sensing device that receives the tilt signal generated by the tilt signal generating device and detects a characteristic of the tilt signal;
        a computing device that computes a change of a parameter, which is used for setting the determination rule, based on the characteristic of the tilt signal;
        a state estimating device that estimates a parking state of the vehicle based on the change of the parameter computed by the computing device;
        a determining device that generates the operational signal when the determining device determines that there is the fear of the theft by comparing the tilt angle and the determination rule; and
        the determination rule setting device sets the determination rule based on an estimation result of the state estimating device.

2. The anti-theft system according to claim 1, wherein:
    the tilt signal generating device generates a pulse when the tilt signal generating device senses a vibration, which vibrates in an at least one direction generally parallel to the predetermined plane;
    the computing device computes a pulse number per a predetermined period as the parameter, which is used for setting the determination rule, based on the characteristic of the tilt signal; and
    the determination rule setting device changes the determination rule relative to a reference value when the pulse number per the predetermined period is larger than a threshold value such that it becomes less likely to be determined that there is the fear of the theft of the vehicle.

3. The anti-theft system according to claim 1, wherein:
    the tilt signal generating device generates a pulse when the tilt signal generating device senses a vibration, which vibrates in an at least one direction generally parallel to the predetermined plane;
    the computing device computes a pulse width per a predetermined period as the parameter, which is used for setting the determination rule, based on the characteristic of the tilt signal; and
    the determination rule setting device changes the determination rule relative to a reference value when the pulse width per the predetermined period is larger than a threshold value such that it becomes less likely to be determined that there is the fear of the theft of the vehicle.

4. The anti-theft system according to claim 1, wherein:
    the tilt signal generating device generates a pulse when the tilt signal generating device senses a vibration, which vibrates in an at least one direction generally parallel to the predetermined plane;
    the computing device computes a change of the pulse as the parameter, which is used for setting the determination rule, based on the characteristic of the tilt signal; and
    the determination rule setting device changes the determination rule relative to a reference value when the change of the pulse is larger than a threshold value such that it becomes less likely to be determined that there is the fear of the theft of the vehicle.

5. The anti-theft system according to claim 1, wherein:
the tilt signal generating device generates a pulse when the tilt signal generating device senses a vibration, which vibrates in an at least one direction generally parallel to the predetermined plane;
the computing device computes a change of the pulse as the parameter, which is used for selling the determination rule, based on the characteristic of the tilt signal;
the determination rule setting device sets the determination rule as a first determination rule when the change of the pulse ranges from a first threshold value to a second threshold value, which is larger than the first threshold value;
the determination rule setting device sets the determination rule as a second determination rule when the change of the pulse is larger than a second threshold value; and
it becomes more likely to be determined that there is the fear of the theft of the vehicle when the first determination rule is used for determining whether there is the fear of the theft of the vehicle than the second determination rule is used.

6. The anti-theft system according to claim 1, wherein:
the computing device computes the tilt angle of the vehicle as the parameter, which is used for setting the determination rule, based on the characteristic of the tilt signal; and
the determination rule setting device changes the determination rule based on a relation between the tilt angle of the vehicle and a threshold value, which is set as the determination rule.

7. The anti-theft system according to claim 6, wherein:
the determination rule setting device changes the determination rule relative to a reference value when the computed tilt angle of the vehicle exceeds a predetermined value, which corresponds to a predetermined ratio of the threshold value, more often than a predetermined frequency such that it becomes less likely to be determined that there is the fear of the theft of the vehicle.

8. The anti-theft system according to claim 1, wherein:
the tilt signal generating device generates a pulse when the tilt signal generating device senses a vibration, which vibrates in an at least one direction generally parallel to the predetermined plane;
the computing device computes a pulse number per a predetermined period as the parameter, which is used for setting the determination rule, based on the characteristic of the tilt signal; and
the determination rule setting device changes the determination rule relative to a reference value when the pulse number per the predetermined period is smaller than a threshold value such that it becomes more likely to be determined that there is the fear of the theft of the vehicle.

9. The anti-theft system according to claim 1, wherein:
the tilt signal generating device generates a pulse when the tilt signal generating device senses a vibration, which vibrates in an at least one direction generally parallel to the predetermined plane;
the computing device computes a pulse width per a predetermined period as the parameter, which is used for setting the determination rule, based on the characteristic of the tilt signal; and
the determination rule setting device changes the determination rule relative to a reference value when the pulse width per the predetermined period is smaller than a threshold value such that it becomes more likely to be determined that there is the fear of the theft of the vehicle.

10. The anti-theft system according to claim 1, wherein:
the tilt signal generating device generates a pulse when the tilt signal generating device senses a vibration, which vibrates in an at least one direction generally parallel to the predetermined plane;
the computing device computes a change of the pulse as the parameter, which is used for selling the determination rule, based on the characteristic of the tilt signal; and
the determination rule setting device changes the determination rule relative to a reference value when the change of the pulse is smaller than a threshold value such that it becomes more likely to be determined tat there is the fear of the theft of the vehicle.

11. The anti-theft system according to claim 10, wherein:
the determination rule setting device changes the determination rule relative to the reference value when the tilt angle of the vehicle is equal to or less than a predetermined value, which corresponds to a predetermined ratio of the threshold value, more often than a predetermined frequency such that it becomes less likely to be determined that there is the fear of the theft of the vehicle.

12. The anti-theft system according to claim 1, wherein:
the tilt signal generating device generates a pulse when the tilt signal generating device senses a vibration, which vibrates in an at least one direction generally parallel to the predetermined plane;
the computing device computes a change amount of the pulse as the parameter, which is used for setting the determination rule, based on the characteristic of the tilt signal;
the determination rule setting device changes the determination rule as a first determination rule when the change of the pulse ranges from a first threshold value to a second threshold value, which is larger than the first threshold value;
the determination rule setting device changes the determination rule as a second determination rule when the change of the pulse is smaller than a first threshold value; and
it becomes more likely to be determined that there is the fear of the theft of the vehicle, when the first determination rule is used for determining whether there is the fear of the theft of the vehicle than the second determination rule is used.

13. The anti-theft system according to claim 1, wherein:
the determination rule is a threshold value that relates to the tilt angle; and
the determining device generates the operational signal when there is a predetermined relation between the threshold value and the tilt angle.

14. The anti-theft system according to claim 1, wherein:
the tilt signal generating device includes at least one of an acceleration sensor, an air pressure sensor for a wheel, a level sensor, and an ultrasonic sensor.

15. The anti-theft system according to claim 1, wherein:
the control device detects the tilt of the vehicle relative to a horizontal plane.

16. The anti-theft system according to claim 1, wherein:
the control device detects the tilt of the vehicle relative to a vertical plane.

17. The anti-theft system according to claim 1, wherein:
the predetermined plane is renewed every predetermined interval.

18. An anti-theft system for a vehicle comprising:
a sensor that senses a tilt of the vehicle relative to a predetermined plane to output a sensing amount;
a characteristic sensing device configured to receive the sensing amount outputted by the sensor and to detect a characteristic of the sensing amount;
a computing device configured to compute a change of a parameter based on the characteristic of the sensing amount;
a state estimating device configured to estimate a parking state of the vehicle based on the change of the parameter computed by the computing device;
a threshold value determining device that determines a threshold value based on an estimation result of the state estimating device; and
a determining device that determines whether the vehicle is under theft based on a relation between the sensing amount and the threshold value.

* * * * *